(12) United States Patent
Engelmann et al.

(10) Patent No.: US 7,784,881 B2
(45) Date of Patent: Aug. 31, 2010

(54) METHOD AND CIRCUIT SYSTEM FOR CALIBRATING VOLTAGE AND TEMPERATURE DEVIATIONS OF THE EFFECTIVE CURRENT OF HYDRAULIC VALVES IN A PWM DRIVE

(75) Inventors: Mario Engelmann, Steinbach/Ts. (DE); Peter Oehler, Frankfurt am Main (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 532 days.

(21) Appl. No.: 10/505,387

(22) PCT Filed: Feb. 26, 2003

(86) PCT No.: PCT/EP03/01944

§ 371 (c)(1),
(2), (4) Date: Aug. 20, 2004

(87) PCT Pub. No.: WO03/074338

PCT Pub. Date: Sep. 12, 2003

(65) Prior Publication Data

US 2005/0104601 A1    May 19, 2005

(30) Foreign Application Priority Data

Mar. 1, 2002 (DE) ............................ 102 08 832

(51) Int. Cl.
*B60T 8/36* (2006.01)
*B60T 15/14* (2006.01)
*B60T 8/66* (2006.01)

(52) U.S. Cl. ........................ 303/119.1; 303/20; 303/162

(58) Field of Classification Search ................ 324/522; 303/119.2, 119.1, 20, 162
See application file for complete search history.

(56) References Cited

U.S. PATENT DOCUMENTS 4,398,252 A * 8/1983 Frait ............................ 701/70

(Continued)

FOREIGN PATENT DOCUMENTS

DE    37 29 183 A1    3/1989

(Continued)

OTHER PUBLICATIONS

International Search Report for Application No. PCT/EP03/01944 dated Jul. 24, 2003.

*Primary Examiner*—Patrick J Assouad
*Assistant Examiner*—Richard V Muralidar
(74) *Attorney, Agent, or Firm*—RatnerPrestia

(57) ABSTRACT

The present invention relates to a method for reducing deviations between the effective current and the measured current in a pulse-width-modulated current control, in particular for electronic brake control units of motor vehicles, wherein the measured current is determined at a certain predefined time within an actuation period and a compensation occurs by means of temperature-responsive and/or supply-voltage-responsive compensation variables which are added to the measured current such that a corrected nominal current is available for current control. The invention also relates to a circuit arrangement for actuating several inductive loads and comprises a circuit for PWM control of the load current. The method of the invention is implemented as a program in a microcomputer or microcomputer system that is electrically connected to the PWM circuit.

14 Claims, 4 Drawing Sheets

---

200 - determine the measured current ($I_{meas}$) at a certain predetermined time during an actuation period ($t_{PWM}$)

202 - determine at least one compensation variable in response to temperature and/or supply voltage 204 - add the at least one compensation variable to the measured current ($I_{meas}$)

206 - determine a corrected nominal current ($I_{nominal}$)

208 - supply corrected nominal current ($I_{nominal}$) to the PWM current control

U.S. PATENT DOCUMENTS 5,645,352 A * 7/1997 Menten .................. 374/183
6,322,166 B1 * 11/2001 Furuya et al. ............ 303/119.2

FOREIGN PATENT DOCUMENTS

| | | |
|---|---|---|
| DE | 42 41 121 A1 | 7/1993 |
| DE | 197 27 765 A1 | 1/1998 |
| EP | 0 636 869 A1 | 7/1993 |
| EP | 0 641 700 A1 | 3/1995 |
| EP | 0 779 631 A2 | 6/1997 |
| EP | 1 065 678 A1 | 1/2001 |
| WO | WO 02/058967 | 8/2002 |

* cited by examiner

200 - determine the measured current ($I_{meas}$) at a certain predetermined time during an actuation period ($t_{PWM}$)

202 - determine at least one compensation variable in response to temperature and/or supply voltage 204 - add the at least one compesation variable to the measured current ($I_{meas}$)

206 - determine a corrected nominal current ($I_{nominal}$)

208 - supply corrected nominal current ($I_{nominal}$) to the PWM current control

METHOD AND CIRCUIT SYSTEM FOR CALIBRATING VOLTAGE AND TEMPERATURE DEVIATIONS OF THE EFFECTIVE CURRENT OF HYDRAULIC VALVES IN A PWM DRIVE

TECHNICAL FIELD

The present invention relates to a method for reducing deviations between the effective current and the measured current in a pulse-width-modulated current control, in particular for electronic brake control units of motor vehicles, and a circuit arrangement for driving several inductive loads comprising a circuit for the PWM control of the load current.

BACKGROUND OF THE INVENTION

It is known that significant differences between the regulated nominal current and the effective current occur in the coil in a valve actuation by means of a pulse-width-modulated current (PWM current control), at least when the ratio between PWM frequency and the time constant of the coil is unfavorable. It is further known in the art that there are dependencies on external parameters such as supply voltage and temperature.

For example, the (maximum possible) current $$I_{100\%} = V_{REFx}/(R_L + R_{DSon\text{-}LS}). \quad (1)$$

flows through a permanently activated inductive load (e.g. valve coil).

This current consequently depends on the voltage at the top side of the valve, and, thus, indirectly, on the battery voltage available in the motor vehicle at terminal KL30B, on the coil resistor $R_L$ and (to a lower degree) on the on-resistor $R_{DSon\text{-}LS}$ of the semiconductor element(s) used to actuate the load(s). Both resistors are highly temperature-responsive: variations of approximately 0.4% per 1° C. for the load resistor (this is e.g. the temperature coefficient for copper, real coils have a somewhat lower dependency) und 0.5% per 1° C. for $R_{DSon\text{-}LS}$ (e.g. Power-MOSFETs, provided on one chip) are typical values.

BRIEF SUMMARY OF THE INVENTION

An object of the invention is to disclose a method and a circuit arrangement for driving loads, reducing deviations from the nominal current and the effective current that flows in the load.

This object is achieved according to the described method and the described circuit arrangement.

A compensation variable according to the invention implies a compensating current $\Delta I$, which can adopt both positive and negative numerical values.

In the method of the invention for reducing deviations between the effective current $I_{RMS}$ and the measured current $I_{meas}$ in a pulse-width-modulated current control, it is preferred to determine the measured current $I_{meas}$ in the middle of the switching time $t_{on}$ during an actuation period $t_{PWM}$.

In a preferred manner, the supply voltage dependency is compensated by the extraction of a valve-related table from defined discrete reference points, wherein the discrete reference points are especially favorably formed of pairs of values produced from the nominal current $I_{nominal}$ and the supply voltage $V_{KL30B}$. Further, it is preferred that values lying between the discrete reference points are determined by interpolation.

Favorably, the valve-related table is stored in a data memory that is preferably a non-volatile data memory in which data is preserved even after the ignition's switch-off.

It is preferred that the compensation variables are determined separately for each load, in particular for each valve coil, or stored in a table.

BRIEF DESCRIPTION OF THE DRAWINGS

FIG. 4 is a flowchart illustrating an exemplary embodiment of the method of the claimed invention.

DETAILED DESCRIPTION OF THE PREFERRED EMBODIMENTS

Figure 1:
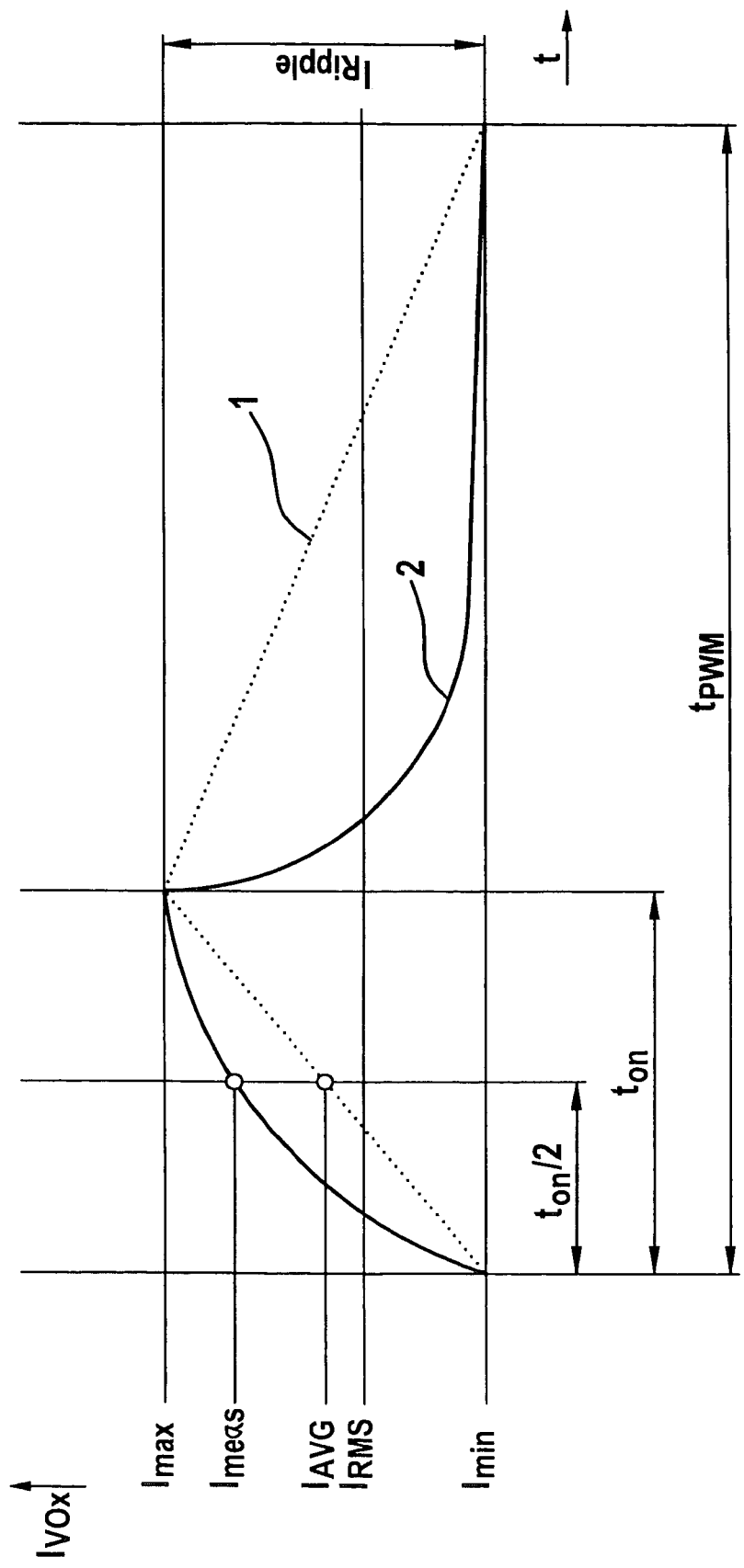
FIG. 1 exhibits the difference between the current measurement in PWM actuation and the average current and the effective current.

The current variation at a valve coil is plotted as a function of time t in FIG. 1. With a current control by means of PWM actuation, an average current of $$I_{AVG} = DC \cdot I_{100\%} = DC \cdot V_{REFx}/(R_L + R_{DSon\text{-}LS}) \quad (2)$$

develops, with DC indicating the pulse-duty factor (Duty Cycle) of the PWM actuation. The mode of operation of a PWM control that can be implemented according to the invention has been disclosed in international patent application PC/EP 0 115 040. Strictly speaking, equality applies only with an actuation by means of straight line 1 or with ideal e-functions.

For current control, it is necessary to measure the present coil current at a defined time, illustrated by the symbol @ ("at"), e.g. after half the switching time $t_{on}$. Consequently, the controller adjusts a measured current $I_{meas}$ of $$I_{meas} = I(@t_{on}/2) = I_{nominal} \quad (3).$$

The measured current $I_{meas}$ corresponds to the average current $I_{AVG}$ only when actuation takes place by way of straight lines. With an actuation with ideal e-functions (corresponds to a coil without an iron core), the current $I_{meas}$ measured at time $t_{on}/2$ is higher that the average current $I_{AVG}$. In current control of a valve, however, the effective current $I_{RMS}$ is of interest that is still somewhat lower than the average current $I_{AVG}$. Saturation effects (hysteresis) will additionally be encountered in a valve that can be illustrated in a simplified manner as a coil with an iron core, with the result that nonlinearities occur, as becomes apparent from the variation of the current curve 2. From this results a further deviation between the effective current $I_{RMS}$ and the measured current $I_{meas}$. Thus, $$I_{nominal} = I_{AVG} = DC \cdot V_{REFx}/(R_L + R_{DSon\text{-}LS}) \quad (4)$$

applies in approximation. This equation is the more precise the higher the PWM frequency is.

Figure 2:
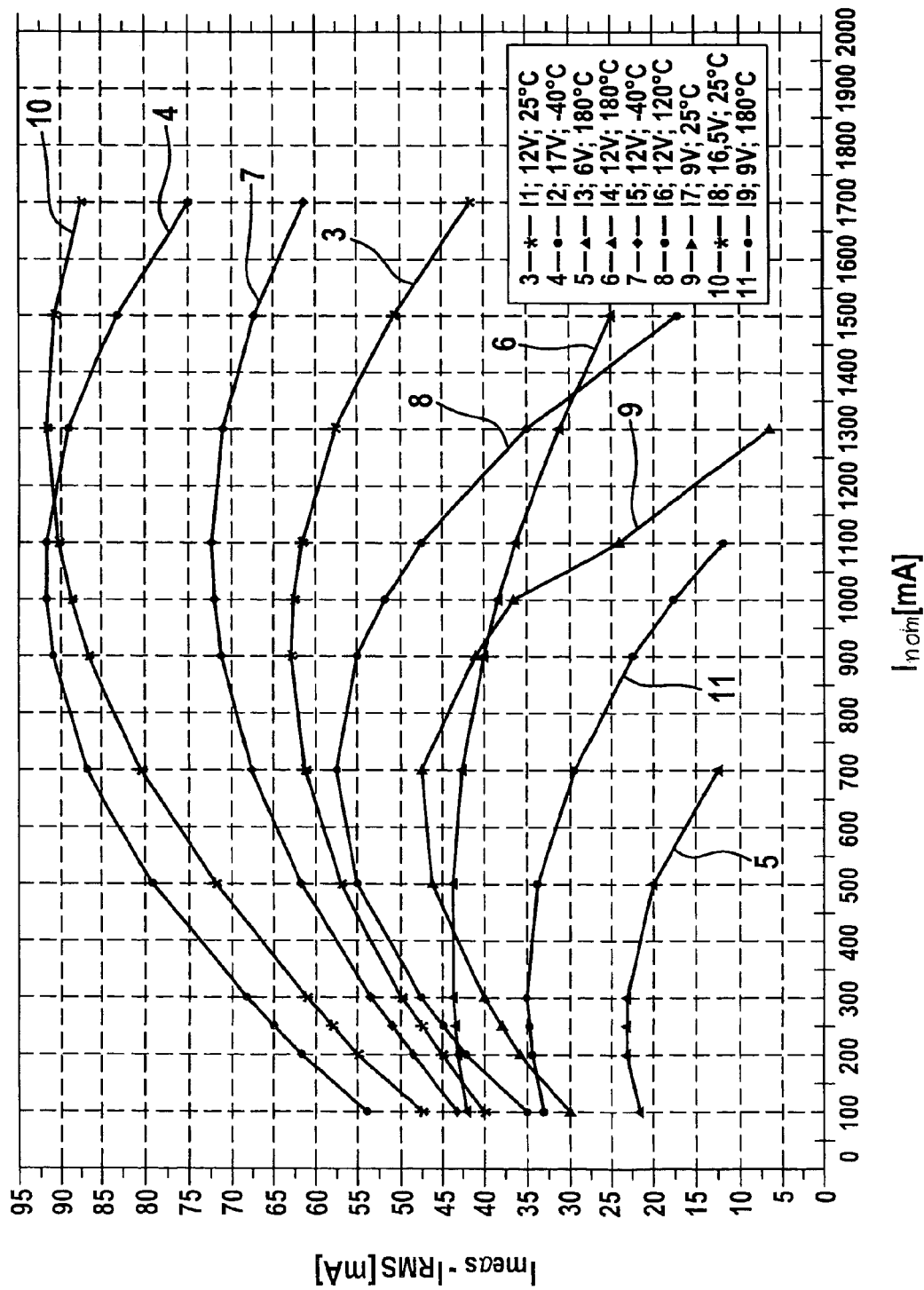
FIG. 2 shows the difference between the measured current and the effective current for a typical hydraulic valve.

FIG. 2 shows the difference between the measured current $I_{meas}$ and the effective current $I_{RMS}$ for the electromagnetic valve of an electronic brake control unit, plotted by way of the nominal current $I_{nominal}$, for different voltages at KL30B and different coil temperatures. The difference decreases with a rising nominal current $I_{nominal}$. This results from the fact that the current controller starts reaching saturation (that means the Duty Cycle amounts to 100% approximately).

A first compensation is still relatively simple in order to eliminate the dependency on the nominal current $I_{nominal}$. A current difference to be taken from the diagram is added for a defined nominal current $I_{nominal}$. This is successful only for a defined voltage and a defined temperature. Example: nominal value compensation at $V_{KL30B}$=12 volt and T=25° C. (curve 3). To reach an effective current $I_{RMS}$=1 A, a nominal current $I_{nominal}$=1 A+62.5 mA is predetermined.

Figure 3:
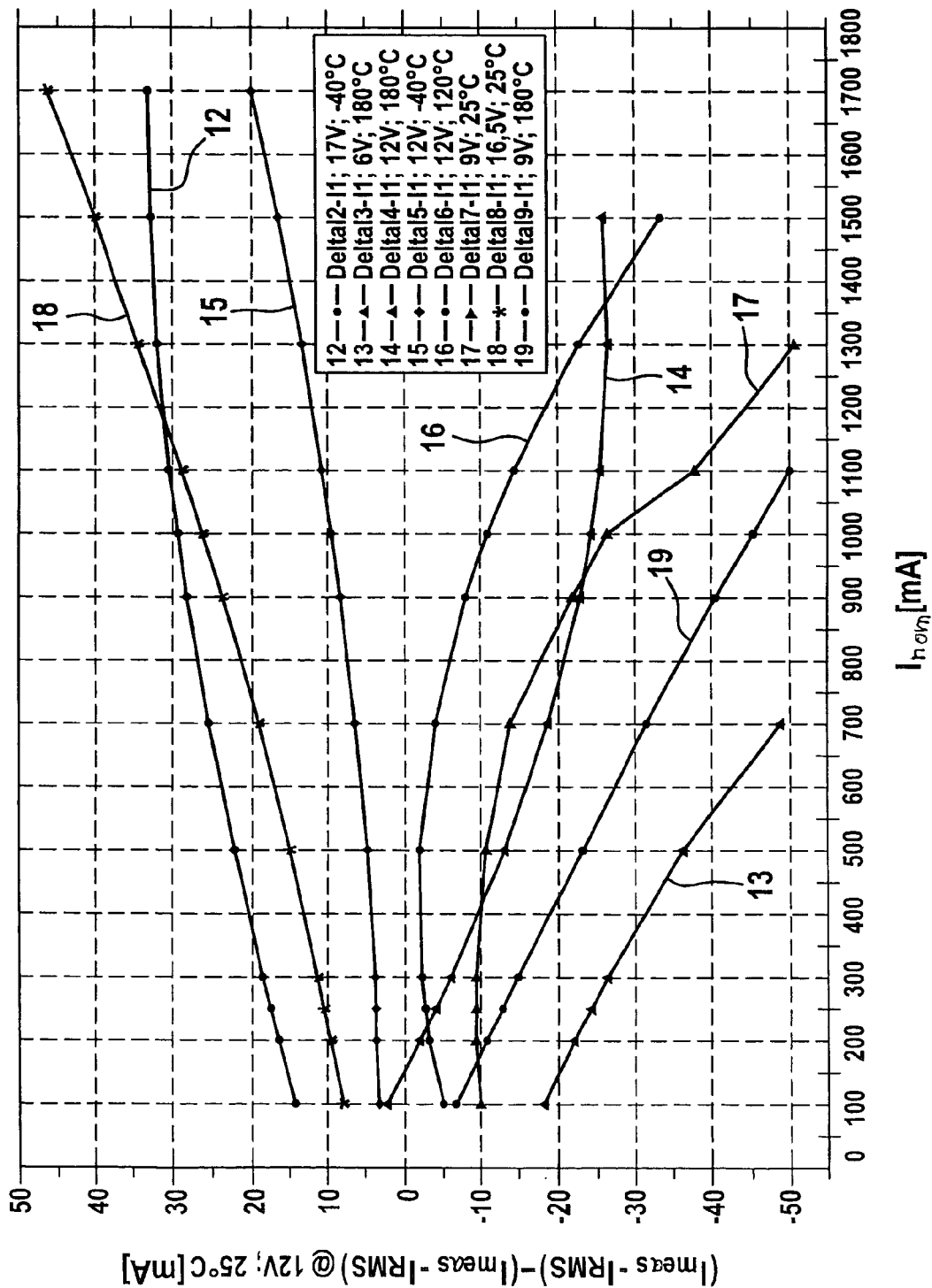
FIG. 3 shows the difference between the measured current and the effective current for a typical hydraulic valve relative to the difference that prevails with a supply voltage of 12 volt and at a temperature of 25° C.

FIG. 3: To detect voltage and temperature dependencies, it is appropriate to illustrate the deviations of the curves of FIG. 2 from a reference curve (at $V_{KL30B}$=12 volt and T=25° C.) (see illustration 3). It can be seen that e.g. at a nominal current $I_{nominal}$=1.1 A, there is a maximum voltage dependency of −37.5 mA/+29 mA at a voltage ranging from 9 volt to 16.5 volt approximately over a constant temperature of 25° C. On the other hand, with a temperature variation of roughly −40° C. to roughly 180° C. with respect to a constant voltage of 12 volt, it is possible to read a maximum temperature dependency of +10.5 mA/−25.5 mA with a nominal current $I_{nominal}$=1.1 A. These two dependencies do not add simply linearly because in the two corner points {17 volt, −40° C.} and {9 volt, 180° C.} only deviations of +30.5 mA/−49.5 mA are reached for 1.1 A. However, the influence of the voltage is significantly greater than the influence of the temperature.

A (valve-related) table is produced for a compensation of the voltage dependency in FIG. 3. Defined discrete reference points are used for this purpose, which respectively comprise a pair of values {$I_{nominal}$, $V_{KL30B}$}, and one compensation current $\Delta I$ is stored with respect to each pair of values {$I_{nominal}$, $V_{KL30B}$} for the adaptation of nominal values. Intermediate values are determined by means of interpolation. For example, it is desired to achieve an increase of the nominal current $I_{nominal}$ of 200 mA to 1000 mA at a voltage of 9 volt at the valve and a temperature of 180° C., corresponding to curve 19 in FIG. 3. To achieve the nominal current $I_{nominal}$=1000 mA, a compensating current $\Delta I$=−45 mA is added to the nominal current $I_{nominal}$=1000 mA. However, as the valve, due to its time constant, follows the specification of the nominal current with delay, initially only a compensating current $\Delta I$=−10 mA is predetermined for compensation. This corresponds to the current compensation at $I_{nominal}$=200 mA. The current variation at the valve is thereby adapted to the variation of the curve 19. Further, the compensating current $\Delta I$ is adjusted corresponding to the course of the curve 19 until the nominal current $I_{nominal}$=1000 mA is reached.

Referring to FIG. 4, the compensation is carried out in accordance with an exemplary embodiment of the invention by: determining the measured current ($I_{meas}$) at a certain predetermined time during an actuation period ($t_{PWM}$) (step 200); determining at least one compensation variables in response to temperature and/or supply voltage (step 202); adding the at least one compensation variables to the measured current ($I_{meas}$) (step 204; determining a corrected nominal current ($I_{nominal}$) (step 206) and supplying the corrected nominal current ($I_{nominal}$) to the PWM current control (step 208).

To compensate variations or abrupt changes in the supply voltage (e.g. at KL30B), an averaging operation by way of the present voltage measurement and previous values is preferred.

For the compensation of the temperature dependency, the temperature is indirectly detected by way of the Duty Cycle adjusted by current control. From equation (4), $$R_L+R_{DSon-LS}=(DC*V_{REFx})/I_{nominal} \tag{5}$$

follows. This formula implies that for the present Duty Cycle only the coil resistor $R_L$ (and the on-resistor $R_{DSon-LS}$) is responsible; the coil temperature appears only indirectly. Therefore, it is initially suitable to convert the data in illustration 3 to a dependency of the coil resistor $R_L$ (and the on-resistor $R_{DSon-LS}$):

$$R_L(T)=R_L(@T_{reference})*(1+\alpha_{coil}*(T_{present}-T_{reference}))$$
$$\text{or } R_{DSon-LS}(T)=R_{DSon-LS}(@T_{reference})*(1+\alpha_{Ron}*(T_{present}-T_{reference})). \tag{6}$$

In equation (6), the temperature-responsive values of the coil resistor $R_L(T)$ and the on-resistor $R_{DSon-LS}(T)$ are determined in consideration of known resistor values $R_L(@T_{reference})$, $R_{DSon-LS}(@T_{reference})$ at a reference temperature $T_{reference}$. To this end, the known resistor values $R_L(@T_{reference})$, $R_{DSon-LS}(@T_{reference})$ are multiplied with coefficients of correction. These coefficients of correction are basically composed of temperature coefficients ($\alpha_{coil}$, $\alpha_{Ron}$) and a temperature difference between the present temperature $T_{present}$, which is determined from the present Duty Cycle, and the reference temperature $T_{reference}$. In this respect, $\alpha_{coil}$ describes the temperature dependency of the coil material used and $\alpha_{Ron}$ describes the temperature dependency of the on-resistor $R_{DSon-LS}$. The on-resistor $R_{DSon-LS}$ represents the parasitic resistance of a switch, with said switch being realized in the shape of a MOSFET-transistor provided on a semiconductor chip. It is also possible to achieve this required switching function in another way, i.e. by means of relay technology, bipolar technology, etc. To relate the dependency to $R_L+R_{DSon-LS}$ rather than to the temperature offers the additional advantage that different temperatures in the valve and in the semiconductor chip are detected correctly because these different temperatures are implicitly contained in the present Duty Cycle.

Each one $\Delta I$ is in turn stored for pairs of values {$I_{nominal}$, $R_L+R_{DSon-LS}$} in a table for the purpose of adaptation of nominal values. An additional calibration is suitable in this respect because equation (4) applies only in approximation. It is advisable to measure the Duty Cycle with a specific valve and reference values (e.g. $I_{nominal}$=1 A, temp.=25° C., $V_{KL30B}$=12 volt) and to convert the table by means of a corresponding offset.

The invention claimed is:

1. Method for generating a corrected nominal current in a pulse-width-modulated current control, in particular for electronic brake control units of motor vehicles,
    wherein a measured current is determined at a certain predetermined time during an actuation period and a compensation is executed by way of at least one compensation current value determined in response to a supply voltage, the compensation current value being added to the measured current so that the corrected nominal current is available for current control.

2. Method as claimed in claim 1,
    wherein the supply voltage dependency is compensated.

3. Method as claimed in claim 1,
    wherein several loads are driven, and the compensation current value is fixed individually for each load, in particular for each valve coil.

4. Method as claimed in claim 1,
wherein an averaging operation is executed by way of the present nominal value and previous nominal values to compensate abrupt changes in nominal values.

5. Method as claimed in claim 4,
wherein a sum of a coil resistor and a resistor of a connected semiconductor component for driving the load is taken into consideration for the determination of temperature.

6. Method as claimed in claim 4,
wherein the Duty Cycles of several PWM periods are averaged for temperature measurement or the determination of the indirect temperature value.

7. Method as claimed in claim 4,
wherein the nominal resistance value of the coil is used at the presently measured or estimated temperature of the control unit for the average value of the indirectly determined temperature quantity directly after the switching on of the ignition, in particular after the ignition's restart.

8. The method as claimed in claim 1 wherein the method is implemented as a program in a microcomputer or microcomputer system which is electrically connected to a PWM circuit.

9. The method as claimed in claim 1 wherein the method is implemented at least in part by digital logic.

10. Method as claimed in claim 1 wherein compensation current values are stored in a table and an interpolation is carried out for supply voltages lying between two table values in order to determine the at least one compensation current value.

11. Method as claimed in claim 1 further comprising determining a second compensation current value based on temperature.

12. Method as claimed in claim 11 wherein compensation current values are stored in a table and an interpolation is carried out for temperatures lying between two table values in order to determine the second compensation current value.

13. Method as claimed in claim 11,
wherein the temperature is determined indirectly by way of the Duty Cycle adjusted by current control.

14. A method for generating a corrected nominal current in a pulse-width-modulated current control for a current actuated valve, the method comprising the steps of:
determining a measured current at a predetermined time during an actuation period of the valve;
determining at least one compensation current value based on a supply voltage; and
adjusting the measured current by the compensation current value to generate the corrected nominal current.

* * * * *